(12) United States Patent
Otsuka

(10) Patent No.: US 6,661,964 B1
(45) Date of Patent: Dec. 9, 2003

(54) SIGNAL RECORDING AND REPRODUCING METHOD AND STORAGE MEDIUM PROCESSOR

(75) Inventor: Satoshi Otsuka, Kanagawa (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 09/375,054

(22) Filed: Aug. 16, 1999

(30) Foreign Application Priority Data

Aug. 20, 1998 (JP) .......................................... P10-234441

(51) Int. Cl.[7] .............................. H04N 5/91; H04N 5/85; H04N 5/781
(52) U.S. Cl. ........................... 386/46; 386/125; 386/126
(58) Field of Search ............................. 386/46, 64, 77, 386/81, 82, 117, 107, 125, 126, 4, 52, 45, 124, 40, 105, 106; H04N 5/91, 5/85, 5/781

(56) References Cited

U.S. PATENT DOCUMENTS 5,418,658 A * 5/1995 Kwon 6,094,695 A * 7/2000 Kornher

* cited by examiner

*Primary Examiner*—Robert Chevalier
(74) *Attorney, Agent, or Firm*—Oblon, Spivak, McClelland, Maier & Neustadt, P.C.

(57) ABSTRACT

The invention relates to a signal recording and reproducing method, and a storage medium processor. A buffer memory for temporarily storing a signal is provided. A boundary point is set in the buffer memory. An area for storing a signal to be recorded on a magneto-optical disc and an area for storing a signal reproduced from the disc are provided. A predetermined area for storing signals in an alternate sector is also provided. When reproducing operation is enabled, a ready command showing that recording and reproduction are enabled is supplied to a computer. Prefetch operation is started and the prefetched signal is stored in the buffer memory. When the computer supplies a write command before recording operation is enabled, a signal is stored in the buffer memory. When a signal is read, a desired signal can be promptly read from the buffer memory. Signal writing processing can be started before recording operation is enabled.

8 Claims, 6 Drawing Sheets

SIGNAL RECORDING AND REPRODUCING METHOD AND STORAGE MEDIUM PROCESSOR

BACKGROUND OF THE INVENTION

1. Field of the Invention

The present invention relates generally to a signal recording and reproducing method, and a storage medium processor. The present invention relates, more particularly, to the signal recording and reproducing method, and a storage medium processor wherein signal storing means for temporarily storing a signal is provided and a movable area boundary point is set in the signal storing means so that a first area for storing a signal to be recorded on a storage medium and a second area for storing a signal reproduced from the storage medium are provided, signals read by prefetching the signals when the storage medium processor is in a signal readable state are stored in the second area, signals supplied before the storage medium processor becomes a signal recordable state are stored in the first area and further, responsibility in a signal recording and reproducing operation is enhanced efficiently utilizing the signal storing means by moving the area boundary point and varying the areas.

2. Description of Related Art

In a computer system, information is generally stored using a storage medium enabling random access, for example, a disc-type storage medium such as a magneto-optical disc. As for a magneto-optical disc, a floating magnetic head or a contact type magnetic head as adopted in a hard disk drive using a magnetic disk is used in place of a fixed magnetic head to enhance its recording density.

When the above floating magnetic head or the above contact type magnetic head is used, a magnetic head driving mechanism for lifting or lowering the magnetic head is provided. When magneto-optical disc is replaced, the magnetic head driving mechanism has to move the magnetic head in a position apart from the magneto-optical disc. However, it takes much time to move the magnetic head, and then a signal cannot be promptly written or read.

SUMMARY OF THE INVENTION

The object of the present invention is to provide a signal recording and reproducing method, and a storage medium processor by which a data signal can be promptly read or written and which enables a computer to process a data signal stored on a storage medium.

In carrying out the invention in one preferred mode, I provide a signal recording and reproducing method wherein signal storing means for temporarily storing a signal is provided and a signal to be recorded on a storage medium or a signal reproduced from a storage medium is stored on the signal storing means. The method comprises setting a movable area boundary point in the signal storing means to form a first area for storing a signal to be stored on the storage medium and a second area for storing a signal reproduced from the storage medium, recording a signal stored on the first area in the storage medium and acquiring a signal to be reproduced on the basis of a signal stored on the second area.

As another preferred mode, I provide a storage medium processor comprising signal recording means for recording a signal on a storage medium, signal reproducing means for reproducing a signal recorded on the storage medium, signal storing means for temporarily storing a signal and control means for controlling the signal recording means, the signal reproducing means and the signal storing means. The control means sets a movable area boundary point in the signal storing means in which a first area for storing a signal to be recorded on the storage medium and a second area for storing a signal reproduced from the storage medium are provided.

In the present invention, the signal storing means for temporarily storing a signal, for example, a buffer memory is provided and a pointer, which is a movable area boundary point, is set in the buffer memory. According to the above pointer, the first area for storing a signal to be recorded on a storage medium and the second area for storing a signal reproduced from the storage medium are provided. When a storage medium is installed and a signal is able to be read therefrom, a prefetched signal is stored in the second area and afterward, a signal to be recorded on the storage medium supplied before a signal is recorded on the storage medium is stored in the first area.

When the first area has a space area or when a signal stored in the first area is recorded on a storage medium and a space area is generated, the pointer is moved and the second area is expanded. Also, when the pointer is moved and the second area is expanded up to the maximum limit, a signal recorded on a storage medium are prefetched and the prefetched signal is stored in this area.

In the signal readable state, a signal to be recorded on a storage medium can be input and afterward, when a signal to be recorded on the storage medium is supplied before a signal is recorded on the storage medium, the above signal is stored in the first area. The pointer is moved according to the quantity of supplied signals and the first area is expanded.

When an alternate area is provided to the storage medium, a third area for storing a signal on the alternate area is provided. Further, when a storage medium is a read only memory, the first area of the signal storing means is used for the second area thereof.

A further understanding of the nature and advantages of the invention may be realized by reference to the following portions of the specification and drawings.

DESCRIPTION OF THE PREFERRED EMBODIMENT

Figure 1:
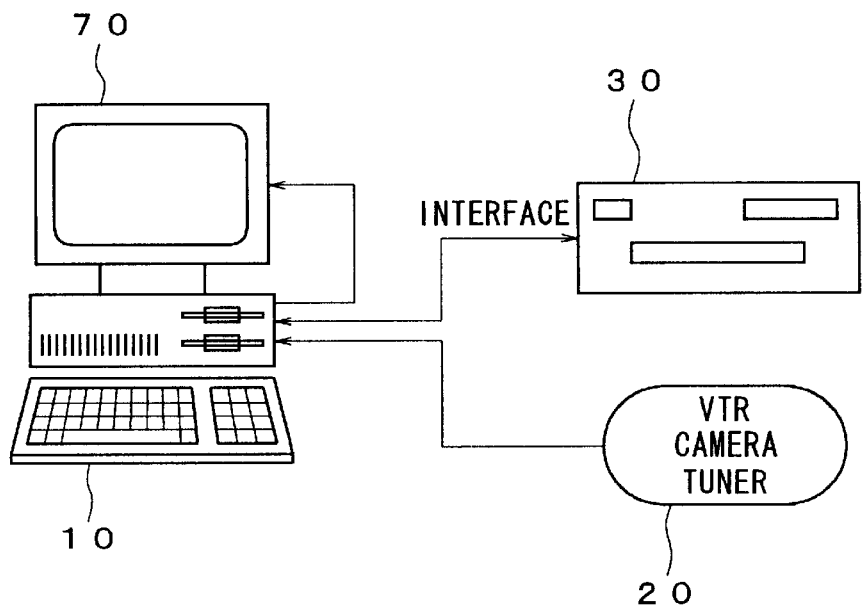
FIG. 1 shows the configuration of a system using a storage medium processor according to the present invention.

Next, referring to the drawings, a preferred embodiment of a storage medium processor according to the present invention will be described in detail.

FIG. 1 shows the whole configuration of a signal processing system using the storage medium processor according to the present invention. As shown in FIG. 1, a signal output device 20 such as a video tape recorder, a video camera or a tuner is connected to a computer 10, and the signal output device 20 supplies a video signal and a sound signal to the computer 10.

The computer 10 converts the video signal and the sound signal to digital signals, compresses them in a quantity of data by encoding and generates the video and sound data signals. A storage medium processor, for example, a disc drive 30 using a magneto-optical disc as a storage medium is connected to the computer 10 via an interface and the generated video and sound data signals are recorded therein.

The disc drive 30 reads each of the video and sound data signals recorded on the magneto-optical disc and supplies them to the computer 10 via the interface. The computer 10 executes processing for decoding a read data signal to restore the signal to a state before compression. The video data signal thus restored to the state before compression is supplied to a display 70 and an image recorded on the magneto-optical disc is displayed on the display 70.

Figure 2:
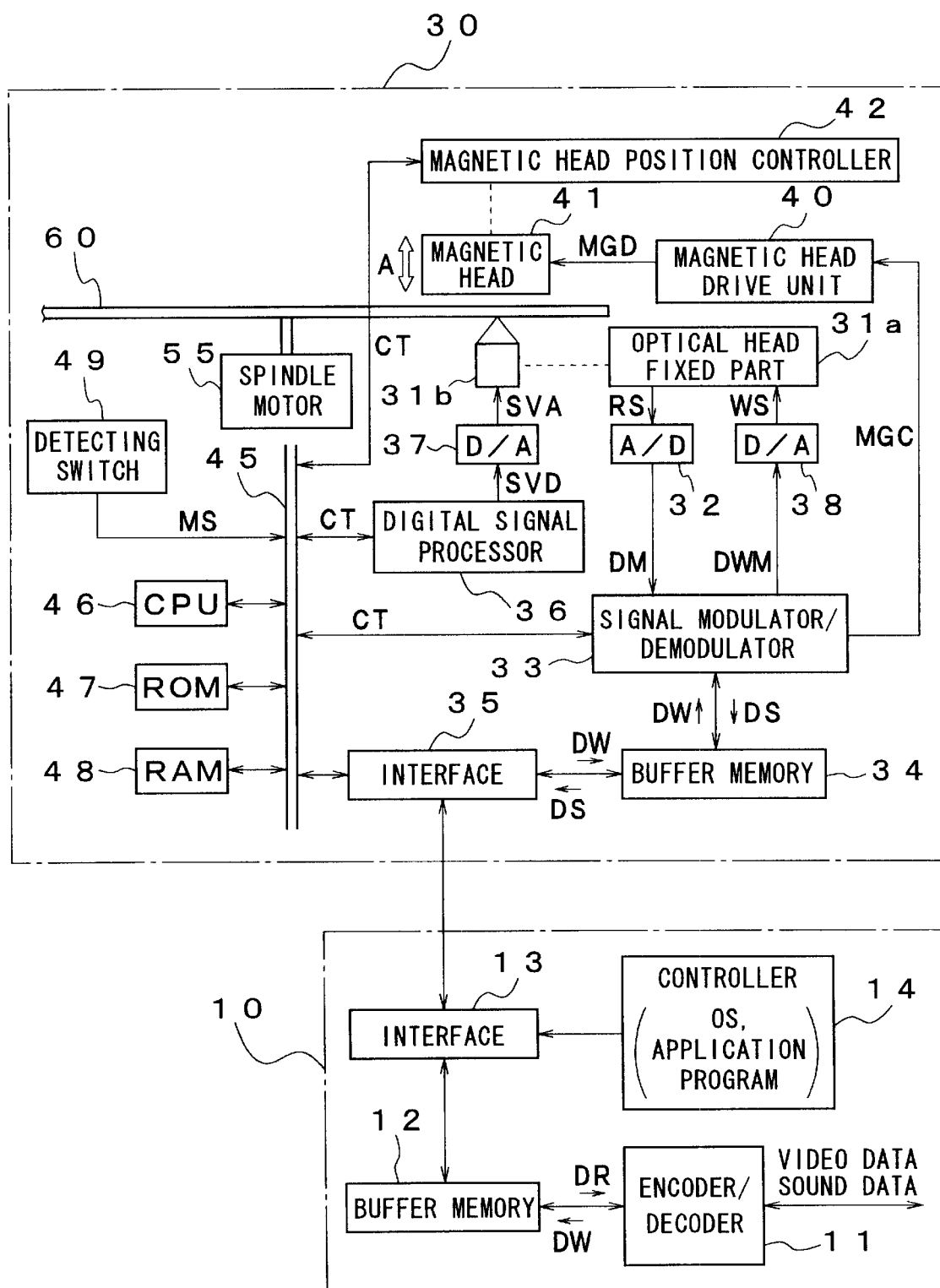
FIG. 2 shows the configuration of a disc drive.

FIG. 2 shows the configuration of the computer 10 and the disc drive 30 that is a storage medium processor. As shown in FIG. 2, an encoder/decoder 11 of the computer 10 encodes or decodes the video and sound data signals. The video and sound data signals encoded by the encoder/decoder 11 are supplied to the disc drive 30 via a buffer memory 12 and an interface 13 such as the one according to a small computer system interface (SCSI) Video and sound data signals supplied from the disc drive 30 are supplied to the encoder/decoder 11 via the interface 13 and the buffer memory 12. The encoder/decoder 11 performs the decoding processing on the signals.

A controller 14 controls the operations of the encoder/decoder 11, the processing for transmitting encoded video and sound data signals and the operations of the disc drive 30 according to an operating system, an application program and others. A command is also transmitted to the disc drive 30 via the interface 13. The controller 14 also controls the operations of the interface 13.

In the disc drive 30, a magneto-optical disc 60 that is enable to be random-accessed is illustratively used as a storage medium.

An information management area is provided on the inner side of the magneto-optical disc 60. A record area is provided on the outer side of the information management area. The video and sound data signals are recorded in the record area and management information such as a file name and the recorded position of the recorded data signal is recorded in the information management area.

An optical head fixed part 31a composing signal recording means and signal reproducing means of the disc drive 30 is composed of a laser diode, an optical detector and others. An optical head movable part 31b is composed of a reflector, an objective lens and others. The signal reproducing means is composed of the optical head fixed part 31a, the optical head movable part 31b, a digital signal processor 36 and others. Also, the signal recording means comprises the optical head fixed part 31a, the optical head movable part 31b and the digital signal processor and others in addition to a magnetic head drive unit 40, a magnetic head 41 and a magnetic head position controller 42B.

The optical path of a laser beam output from the laser diode of the optical head fixed part 31a is changed by the optical head movable part 31b. Laser beams are focused and are irradiated on the magneto-optical disc 60.

The optical path of the reflected light of a laser beam from the magneto-optical disc 60 is changed by the optical head movable part 31b and the reflected light is supplied to the optical head fixed part 31a.

In the optical head fixed part 31a, the reflected light is converted to electric information and a read signal RS is generated. The read signal RS is converted to a digital signal DM by an A/D converter 32 and is supplied to a signal modulator/demodulator 33.

In the signal modulator/demodulator 33, the signal DM is demodulated. A signal acquired by demodulating the signal DM is supplied to a buffer memory 34 as a data signal DS.

The buffer memory 34 stores the data signal DS temporarily, the stored data signal DS is read and is supplied to the computer 10. The data signal is transmitted to the computer 10 via an interface 35.

When the computer 10 supplies a data signal DW to be recorded on the magneto-optical disc 60, it is supplied to the signal modulator/demodulator 33 via the interfaces 35 and the buffer memory 34.

In case a signal is recorded on the magneto-optical disc 60 according to a light modulation method, the signal modulator/demodulator 33 modulates the data signal DW. Thus, a signal to be recorded DWM is generated and is supplied to a D/A converter 38. A magnetic head control signal MGC is also generated and is supplied to the magnetic head drive unit 40.

In the D/A converter 38, the signal to be recorded DWM is converted to an analog signal to be recorded WS and is supplied to the optical head fixed part 31a. In the optical head fixed part 31a, the output of a laser beam is controlled based upon the signal to be recorded WS.

In the magnetic head drive unit 40, a head driving signal MGD is generated and the magnetic head 41 is driven on the basis of the supplied magnetic head control signal MGC. Therefore, a magnetic field is applied to the magneto-optical disc 60 and a signal is recorded on the magneto-optical disc 60. A signal is recorded not only according to the light modulation method but may be recorded according to a magnetic field modulation method.

The digital signal processor 36 generates a servo signal SVD for tracking and focusing to control the optical head movable part 31b so that the irradiated position and the focal position of a laser beam are respectively positioned on the desired positions of the magneto-optical disc 60. The servo signal SVD is converted to an analog servo signal SVA by the D/A converter 37 and is supplied to the optical head movable part 31b.

The signal modulator/demodulator 33 and the digital signal processor 36 are connected to a central processing unit (hereinafter called CPU) 46 that is control means, via a bus 45 such as an address bus, a data bus and a control bus. They are controlled according to a control signal CT from CPU 46.

The interface 35, a read only memory (ROM) 47 and a random access memory (RAM) 48 are connected to the bus 45 and processing is executed by CPU 46 according to a command supplied from the computer 10 via the interface 35, and various program data and others recorded on ROM 47 for controlling the operations of the disc drive 30. A spindle motor 55 rotates the magneto-optical disc 60 at predetermined speed.

Further, the magnetic head position controller 42 moves the magnetic head 41 in a direction shown by an arrow A over the magneto-optical disc 60. When the magneto-optical disc 60 is extracted from the disc drive 30, the magnetic head 41 is moved so that it is apart from the magneto-optical disc 60. When the magneto-optical disc 60 is installed in the disc drive 30, the magnetic head 41 is moved in a direction in which the magnetic head 41 is touched to the magneto-optical disc 60. The position of the magnetic head 41 is also controlled according to a control signal CT from CPU 46.

A detecting switch 49 for detecting whether the magneto-optical disc 60 is installed in the disc drive 30 or not and whether a signal can be written to the installed magneto-optical disc 60 or not is also provided. A detected signal MS showing the result of detection from the detecting switch 49 is supplied to CPU 46 via the bus 45.

Next, processing by CPU 46 in the disc drive 30 will be described. First, in a step ST1 of a flowchart shown in FIG. 3, it is judged whether the magneto-optical disc 60 is installed in the disc drive 30 or not. When it is judged based upon the detected signal MS that the magneto-optical disc 60 is not installed in the disc drive 30, the processing is returned to the step ST1. When it is detected that the magneto-optical disc 60 is installed in the disc drive 30, the processing proceeds to a step ST2.

In the step ST2, it is judged whether the installed magneto-optical disc 60 is ready to write a signal thereon or not. When it is judged based upon the detected signal MS that a signal can be written to the magneto-optical disc 60, the processing proceeds to a step ST3. When it is judged that a signal cannot be written to the magneto-optical disc 60, the processing proceeds to a step ST6.

In the step ST3, the disc drive 30 is set to a signal readable state in which a signal recorded on the magneto-optical disc 60 can be read. That is, the spindle motor 55 rotates the magneto-optical disc 60, a laser beam is irradiated on the magneto-optical disc 60 from the optical head fixed part 31*a* via the optical head movable part 31*b*, and focusing servo operation and tracking servo operation are started.

Further, management information stored on the magneto-optical disc 60 is read so that desired signals can be read from the magneto-optical disc 60. The processing proceeds to a step ST4.

In the step ST4, the disc drive 30 supplies to the computer 10 a ready command showing that the disc drive 30 is ready for not only reproducing operation but recording operation and the processing proceeds to a step ST5. In the step ST5, the disc drive 30 is set as a drive by which a signal can be recorded and reproduced and the operations are executed.

When the processing proceeds from the step ST2 to the step ST6, the disc drive 30 is set as a drive in which only reproduction of a signal is enabled and the operation is executed in the step ST6.

Next, using a flowchart shown in FIG. 4, the processing of CPU 46 when the disc drive 30 is set as a drive by which a signal can be recorded and reproduced will be described. In a step ST11, an area for reproduction of the buffer memory 34 is expanded up to the maximum limit and the prefetch operation of signals recorded on the magneto-optical disc 60 is started.

Figure 5:
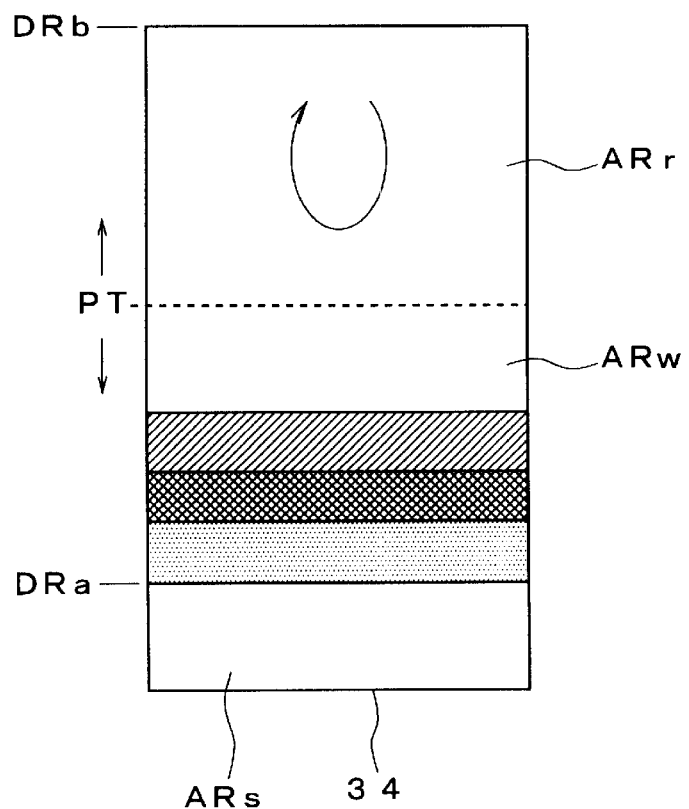
FIG. 5 shows the areas of a buffer memory.

The buffer memory 34, which is signal storing means, comprises an area for recording ARw which is a first area, an area for reproduction ARr which is a second area and an area for an alternate sector ARs which is a third area, as shown in FIG. 5.

The area for recording ARw temporarily stores the data signal DW supplied from the computer 10 and to be recorded on the magneto-optical disc 60. The area for reproduction ARr temporarily stores a data signal DS read from the magneto-optical disc 60. The area for an alternate sector ARs stores a signal recorded in an alternate sector provided for the defect processing of the recorded side of the magneto-optical disc 60. As for the area for an alternate sector ARs, memory capacity is set beforehand. The position PT of a pointer which is an area boundary point between the area for reproduction ARr and the area for recording ARw can be moved in a range from an address DRa to an address DRb.

In the area for reproduction ARr, a data signal DS is stored according to, for example, a ring method. According to the ring method, the area for reproduction ARr is used as a ring-shaped area, and data signals DS are recorded so that the address DRb and the position PT continue.

Also, in the area for recording ARw, data signals DW are stored according to, for example, a command size method. According to the above command method, data signals DW are recorded in the area for recording ARw every unit corresponding to a write command.

When the data signals DW stored in the area for recording ARw are written to the magneto-optical disc 60 so that a space area is provided in the area for recording ARw or a space area is left in the area for recording ARw, the position PT of the pointer is moved in the direction of the address DRa to expand the area for reproduction ARr. Therefore, this prevents the data signals DW supplied from the computer 10 and stored in the area for recording ARw from being lost.

As data signals DS stored in the area for reproduction ARr can be read from the magneto-optical disc 60 again even if they are lost, the position PT of the pointer is moved in the direction of the address DRb according to the quantity of data signals DW supplied from the computer 10 and the area for recording ARw may be also expanded. As described above, many data signals DW can be stored by expanding the area for recording ARw.

Storing the data signals in an alternate sector in the area for the alternate sector ARs allows the data signals in an alternate sector to be promptly read from the area for the alternate sector ARs without moving the optical head movable part 31*b* to the position of the alternate sector.

When data signals in an alternate sector is frequently read, storing the data signals in the alternate sector in the area for alternate sector ARs allows the data signals recorded on the magneto-optical disc 60 to be further efficiently reproduced.

Further, the data signals to be stored in an alternate sector of the magneto-optical disc 60 is stored on the area for an alternate sector ARs. The processing for recording data signals in an alternate sector can be also promptly executed by storing data signals recorded in the area for an alternate sector ARs on the alternate sector when operation is finished or signal recording operation or reproducing operation is not executed.

Figure 4:
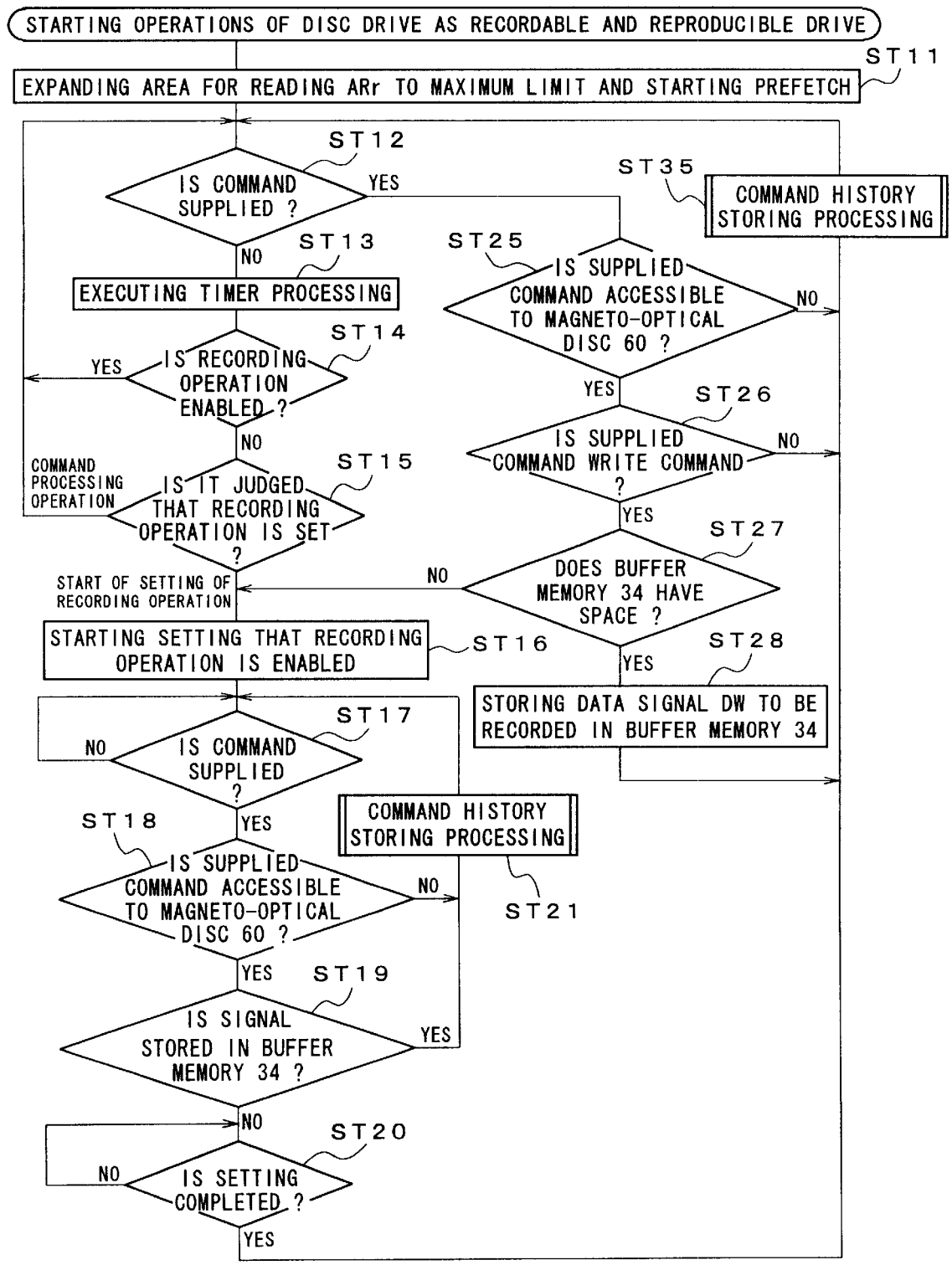
FIG. 4 is a flowchart showing an operation as a recordable and reproducible drive.

In the step ST11 as shown in FIG. 4, the position PT of the pointer is moved in the direction of the address DRa so that the area for reproduction ARr is expanded up to the maximum limit, and signal prefetch operation is executed and the processing proceeds to a step ST12. For example, the signal prefetch operation is a prefetch processing that signals in a file system including directory information and others are read from a logical sector 0 of the magneto-optical disc 60 and are stored in the area for reproduction ARr. As described above, as the area for reproduction ARr is expanded up to the maximum limit and the signal prefetch operation is executed, probability in which a desired data signal is stored in the area for reproduction ARr can be enhanced and the desired signal can be promptly read from the area for reproduction ARr.

In the step ST12, it is judged whether a command is supplied from the computer 10 via the interface 35 or not. In the step ST12, when no command is supplied, the processing proceeds to a step ST13. When it is judged that a command is supplied, the processing proceeds to a step ST25.

When the processing proceeds to a step ST14 after processing waits by predetermined time t1 set according to an interval of time at which a command is supplied in timer processing in the step ST13, it is judged in the step ST14 whether a writing test and others are normally completed and recording operation is enabled by magnetic head position controller 42 or not after the magnetic head 41 is moved to a predetermined position. In the step ST14, when recording operation is enabled, the processing is returned to a step ST12. When recording operation is not enabled, the processing proceeds to a step ST15.

In the step ST15, it is judged whether the operation of the drive (hereinafter called "recording operation") is set to enable recording operation or not.

Figure 6:
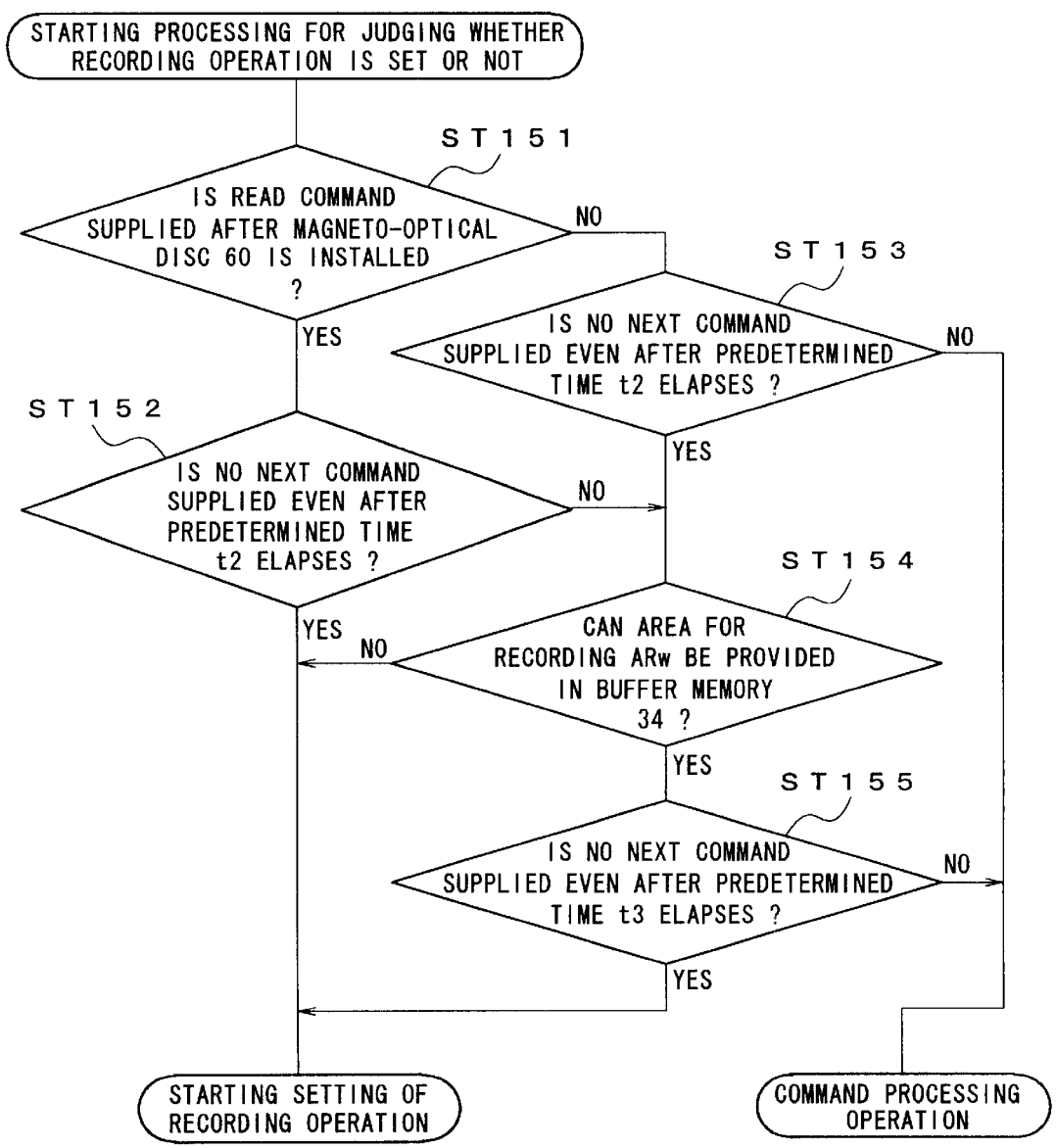
FIG. 6 is a flowchart showing execution discrimination processing for setting recording operation.

FIG. 6 shows execution judgment processing for setting recording operation. In a step ST151, it is judged whether the computer 10 supplies a read command for reading a signal recorded on the magneto-optical disc 60 or not after the magneto-optical disc 60 is installed in the disc drive 30. In the step ST151, when the computer 10 supplies the read command, the processing proceeds to a step ST152. When the computer 10 supplies no read command, the processing proceeds to a step ST153.

In the step ST152, it is judged whether no next command is supplied even after predetermined time t2 elapses since the read command is supplied. In the step ST152, when no next command is supplied even after the predetermined time t2 elapses, the setting of recording operation is started because an interval at which a command is supplied passes. When the next command is supplied before the predetermined time t2 elapses, the processing proceeds to a step ST154.

When the processing proceeds from the step ST151 to the step ST153, it is judged in the step ST153 whether the computer 10 supplies no command even after the predetermined time t2 elapses, as in the step ST152. When the computer 10 supplies no command, the processing proceeds to a step ST154. When the computer 10 supplies a command, command processing operation is executed.

When the processing proceeds from the step ST152 or the step ST153 to the step ST154, it is judged in the step ST154 whether the area for recording ARw can be provided to the buffer memory 34 or not. As the data signal DW supplied from the computer 10 cannot be temporarily stored when the area for recording ARw cannot be provided, the setting of recording operation is started. When the area for recording ARw can be provided, the processing proceeds to a step ST155.

In the step ST155, it is judged whether the computer 10 supplies no command even after predetermined time t3 longer than the predetermined time t2 elapses. In the step ST155, when the computer 10 supplies no command, the setting of recording operation is started because an interval at which a command is supplied passes. When the computer 10 supplies a command, command processing operation is executed.

As described above, in the step ST15 shown in FIG. 4, it is judged whether recording operation should be set or not. When it is judged that the setting of recording operation should be started, the processing proceeds to a step ST16. When it is judged that command processing operation should be executed, the processing is returned to the step ST12.

In the step ST16, setting for enabling recording operation is started. That is, the magnetic head 41 is moved on the side of the magneto-optical disc 60 by the magnetic head position controller 42 and a writing test and others are also started.

Next, in a step ST17, it is judged whether the computer 10 supplies a command via the interface 35 or not. In the step ST17, when the computer 10 supplies a command, the processing proceeds to a step ST18. When the computer 10 supplies no command, the processing is returned to the step ST17.

In the step ST18, it is judged whether the supplied command is accessible to the magneto-optical disc 60 or not. In the step ST18, when the supplied command is a command relating to the reproduction of a signal recorded on the magneto-optical disc 60 or the recording of a signal on the magneto-optical disc 60 and others, the processing proceeds to a step ST19. When the supplied command is not an access command to the magneto-optical disc 60, the processing proceeds to a step ST21.

In the step ST19, it is judged whether a data signal required in an access command to the magneto-optical disc 60 is temporarily stored in the buffer memory 34 or not. In the step St19, when a read command for reading a signal recorded on the magneto-optical disc 60 is supplied and a data signal DS read by the read command is stored in the buffer memory 34, the processing proceeds to the step ST21. In the other case, the processing proceeds to a step ST20.

In the step ST20, it is judged whether the setting of recording operation started in the step ST16 is completed or not. In the step ST20, when the setting is not completed, the processing is returned to the step ST20. When the setting is completed, the processing proceeds to a step ST35.

In the step ST21, the supplied command is stored as history information, the processing of the command is executed and the processing is returned to the step ST17.

As described above, even if a command is supplied during a period in which setting is performed so that recording operation is enabled, the command can be processed. It can be judged based upon the stored history information what command is supplied and processed.

Next, when it is judged in the step ST12 that a command is supplied and the processing proceeds to a step ST25, it is judged in the step ST25 whether the supplied command is accessible to the magneto-optical disc 60 or not. When it is judged that the supplied command is an access command, the processing proceeds to a step ST26. When the supplied command is not an access command, the processing proceeds to the step ST35.

In the step ST26, it is judged whether the supplied command is a write command for writing a signal on the magneto-optical disc 60 or not. In the step ST26, when the supplied command is a write command, the processing proceeds to a step ST27. When the supplied command is not a write command, the processing proceeds to the step ST35.

In the step ST27, it is judged whether the buffer memory 34 has space for storing a signal to be recorded on the magneto-optical disc 60 or not. It is judged by processing shown in a flowchart in FIG. 7 whether the buffer memory has the space or not.

Figure 7:
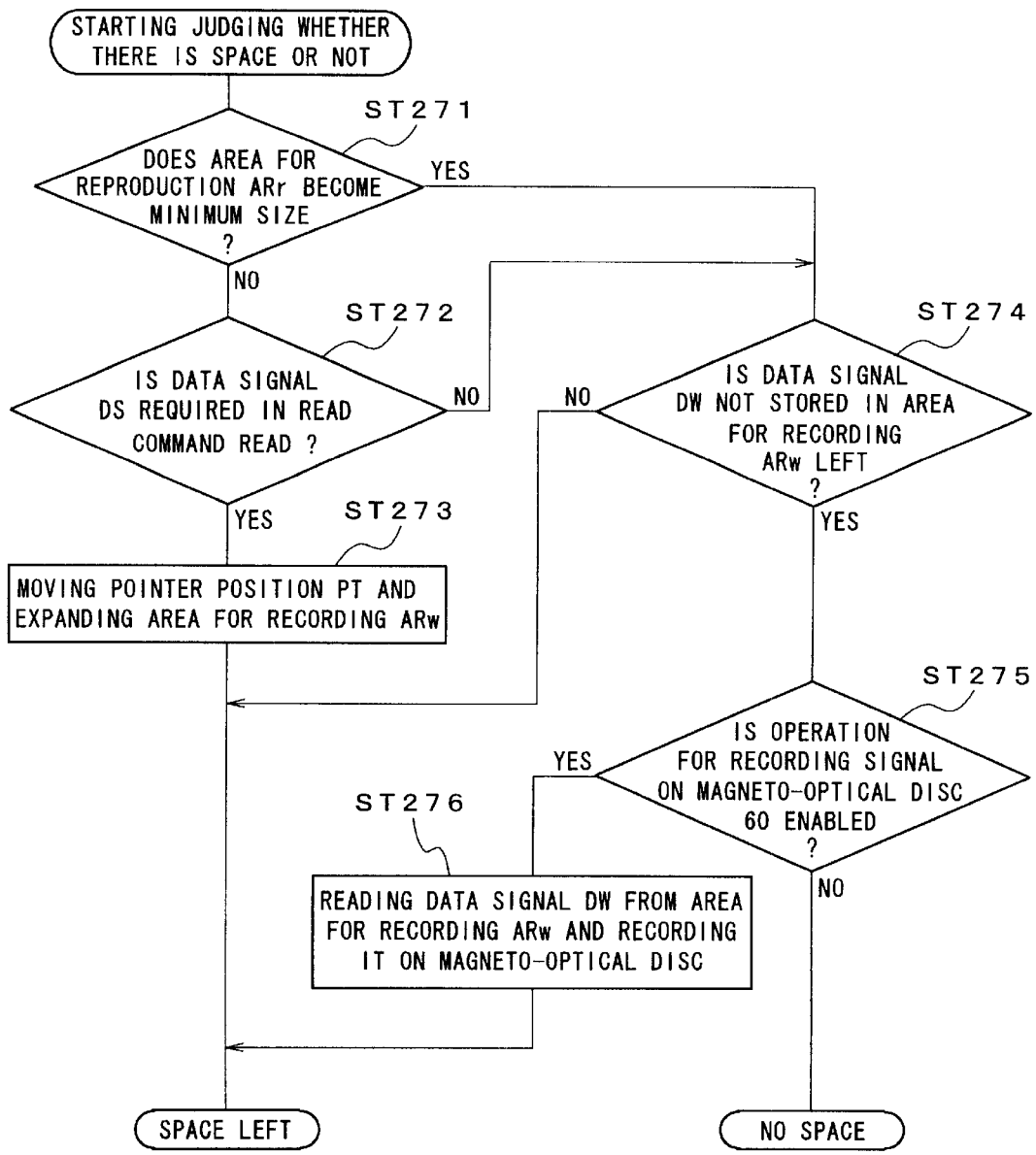
FIG. 7 is a flowchart showing space discrimination processing.

In a step ST271 shown in FIG. 7, it is judged whether the area for reproduction ARr of the buffer memory 34 becomes the minimum size or not. In the step ST271, when the area for reproduction ARr does not become the minimum size, the processing proceeds to a step ST272. When the area for reproduction ARr becomes the minimum size, the processing proceeds to a step ST274.

In the step ST272, it is judged whether a read command is supplied and a data signal DS required in the read command is read from the area for reproduction ARr or not. In the step ST272, when the data signal DS is read from the area for reproduction ARr, the processing proceeds to a step ST273. When the data signal DS is not read from the area for reproduction ARr, the processing proceeds to the step ST274.

In the step ST273, the position PT of the pointer shown in FIG. 5 is moved on the side of the address DRb because the data signal DS is read from the area for reproduction ARr. Thus, a space is prepared by expanding the area for recording ARw.

As commands are stored as history information in the above step ST21 and the step ST35 described later, it can be correctly and easily judged by utilizing the history information how the data signal DS can be read from the area for reproduction ARr and how the position PT of the pointer can be moved.

In the step ST274, it is judged whether the data signal DW having not yet been recorded on the magneto-optical disc 60 is left in the area for recording ARw or not. In the step ST274, when it is judged that the data signal DW is left, the processing proceeds to a step ST275. When no data signal DW not recorded is left, it is judged that the area for recording ARw has space for storing the data signal DW.

In the step ST275, it is judged whether the data signal DW can be recorded on the magneto-optical disc 60 or not. In the step ST275, when the data signal DW can be recorded, the processing proceeds to a step ST276. When the data signal DW cannot be recorded, it is judged that the area for recording ARw of the buffer memory 34 has no space to write the data signal DW.

In the step ST276, a write command not processed is executed and then the data signal DW is recorded on the magneto-optical disc 60. The data signal DW is recorded on the magneto-optical disc 60 and an area wherein the data signal DW has been stored becomes a space area. It is judged that the area for recording ARw has space for storing the data signal DW.

As described above, when it is judged whether the buffer memory 34 has space for storing a signal to be written to the magneto-optical disc 60 or not, and it is judged that the data signal DW cannot be recorded on the magneto-optical disc 60 and the buffer memory has no space, the processing is returned to the step ST16 shown in FIG. 4 and the recording operation is set. When it is judged that the buffer memory has space, the processing proceeds to a step ST28.

In the step ST28, the data signal DW to be recorded on the magneto-optical disc 60 is stored in the area for recording ARw of the buffer memory 34 and the processing proceeds to the step ST35.

In the step ST35, a command is stored as history information, the command is executed and the processing is returned to the step ST12.

As described above, when the disc drive 30 is set as recordable and reproducible, a signal recorded on the magneto-optical disc 60 is prefetched before recording operation is enabled and is stored in the buffer memory 34. A ready command is also output to the computer 10. Therefore, a desired signal can be promptly read before recording operation is enabled by prefetching a signal to be read first and storing it in the buffer memory 34.

When a ready command is output to the computer 10 and a write command and a signal to be recorded are supplied from the computer 10 before recording operation is enabled, the command is stored, the signal to be recorded is stored in the buffer memory 34 and when recording operation is enabled, the signal stored in the buffer memory 34 is recorded on the magneto-optical disc 60. Therefore, a signal can be written from the computer 10 before recording operation is enabled in the disc drive 30 and start-up time can be reduced.

Further, as the area for an alternate sector ARs, the area for reproduction ARr and the area for recording ARw are provided to the buffer memory 34 and the pointer showing the position of a boundary between the area for reproduction ARr and the area for recording ARw can be moved, the buffer memory 34 can be effectively utilized.

When the area for reproduction ARr is expanded, probability that a desired data signal is stored in the area for reproduction ARr can be enhanced. When the area for recording ARw is expanded, the data signal DW supplied from the computer can be stored even if it takes much time until the recording operation of the disc drive 30 is enabled.

Also, as signals in an alternate sector are stored in the area for an alternate sector ARs, the signals can be promptly and easily read even if the recording side of the magneto-optical disc 60 has a defect. If signals in an alternate sector are also prefetched and are stored in the area for an alternate sector ARs, the signal can be promptly read even if the signal to be read first is recorded in the alternate sector. Further, processing for recording a signal in an alternate sector can be promptly executed by storing a data signal to be recorded in the alternate sector in the area for an alternate sector ARs and afterward, recording it in an alternate sector of the magneto-optical disc 60.

Figure 3:
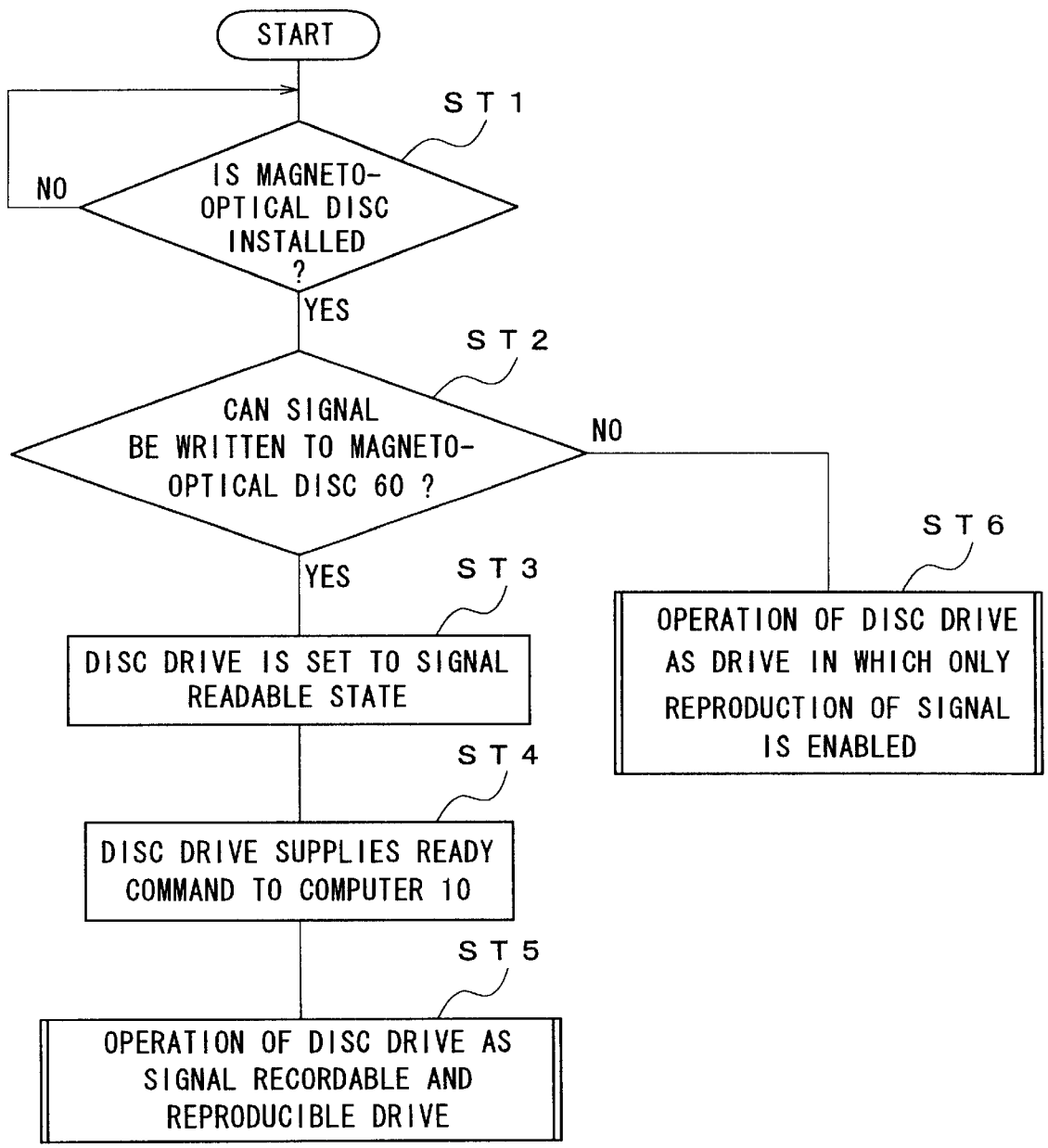
FIG. 3 is a flowchart showing an operation of the disc drive.

When it is judged in the step ST2 shown in FIG. 3 that the magneto-optical disc 60 is a read only memory and the disc drive 30 is set as only reproducible in the step ST6, the buffer memory 34 can be further efficiently used by using the area for recording ARw of the buffer memory 34 for the area for reproduction ARr.

In the above embodiment, the disc drive using a magneto-optical disc is described. However, a disc drive may has only to be a storage medium processor wherein time required until the reproduction of a signal is enabled and time required until the recording of a signal is enabled are illustratively different and is not limited to a disc drive using a magneto-optical disc for a storage medium.

According to the present invention, as an area boundary point which can be moved is set in the signal storing means, the first area for storing a signal to be recorded on the storage medium and the second area for storing a signal reproduced from the storage medium are provided, the signal stored in the first area is recorded on the storage medium and a reproduced signal is acquired based upon the signal stored in the second area, a signal can be promptly reproduced by storing a prefetched signal in the second area and reading the signal from the second area and the recording of a signal can be also promptly started by storing a signal to be recorded in the first area before a recordable state.

Also, when the first area has a space area or when a space area is generated, the area boundary point is moved and the second area is expanded. Therefore, even if the second area is expanded to store more signals reproduced from the storage medium, this prevents signals stored on the storage medium from being lost.

Also, when the storage medium is installed, the area boundary point is moved and the second area is expanded up to the maximum limit, prefetch is executed and read signals are stored in the second area. Therefore, as many signals can be stored in the second area by prefetch operation, probability that a desired signal is stored in the second area can be enhanced and then the desired signal can be promptly read.

Also, when the storage medium is installed and the disc drive is ready to read a signal from the storage medium, a signal to be recorded on the storage medium can be input and thereafter, the signal is stored in the first area of the signal storing means during a period until a signal is recorded again. Therefore, even before the signal recordable state, signal recording processing can be started.

Further, as the area boundary point is moved according to the quantity of supplied signals and the first area is expanded, a signal to be recorded on the storage medium can be stored even if a period until the signal is recorded is long.

Also, as the third area for storing signals in an alternate area is provided to the signal storing means in case the alternate area is provided to the storage medium, the signals can be satisfactorily reproduced by reading the signals from the third area even if a defect occurs in the storage medium. The processing for recording signals in an alternate sector can be promptly executed by storing signals in the new alternate sector in the third area and afterward, recording them in the alternate area of the signal storing means.

Further, as the first area of the signal storing means is used for the second area when the storage medium is a read only memory, the signal recording means can be further effectively utilized.

While the above is a complete description of the preferred embodiments of the invention, various alternatives, modifications and equivalents may be used. Therefore, the above description should not be taken as limiting the scope of the invention as defined by the appended claims.

What is claimed is:

1. A signal recording and reproducing method wherein signal storing means for temporarily storing a signal to be recorded on a storage medium or a signal reproduced from said storage medium is provided, comprising the steps of:

setting a movable area boundary point in said signal storing means to form a first area for storing a signal to be stored on said storage medium and a second area for storing a signal reproduced from said storage medium;

recording a signal stored on said first area in said storage medium: and acquiring a signal to be reproduced on the basis of a signal stored on said second area.

2. The signal recording and reproducing method according to claim 1, comprising the additional step of moving said area boundary point so as to expand said second area when the first area of said signal storing means has a space area or when the signal stored in said first area is recorded on said storage medium and a space area is generated.

3. The signal recording and reproducing method according to claim 1, wherein:

said storage medium can be installed and extracted;

said method comprising the additional steps of, when said storage medium is installed, moving said area boundary point so as to allow said second area to be set maximum;

prefetching a signal recorded on said storage medium; and storing the prefetched signal on said second area.

4. The signal recording and reproducing method according to claim 1, wherein:

said storage medium can be installed and extracted;

said method comprising the additional steps of inputting a signal to be recorded on said storage medium when said storage medium is installed and a signal is able to be read therefrom; and storing said supplied signal in said first area of said signal storing means when a signal to be recorded on said storage medium, thereafter, is supplied before a signal is recorded on said storage medium.

5. The signal recording and reproducing method according to claim 4, comprising the additional step of moving said area boundary point according to the quantity of said supplied signals so as to expand said first area.

6. The signal recording and reproducing method according to claim 5, further comprising:

storing in said first area a signal reproduced from said storage medium when said storage medium is a read only memory.

7. A storage medium processor, comprising:

signal recording means for recording a signal on a storage medium;

signal reproducing means for reproducing a signal recorded on said storage medium;

signal storing means for temporarily storing a signal; and control means for controlling said signal recording means, said signal reproducing means and said signal storing means, wherein said control means sets a movable area boundary point in said signal storing means in which a first area for storing a signal to be recorded on said storage medium and a second area for storing a signal reproduced from said storage medium are provided.

8. The storage medium processor according to claim 7, wherein:

said storage medium can be installed and extracted;

when said control means detects that said storage medium is installed and said signal reproducing means allows the reproduction of a signal, said control means permits a signal to be recorded on the storage medium to input; and when the signal to be recorded on said storage medium is supplied before said signal recording means allows the recording of a signal, said control means stores the supplied signal in said first area of said signal storing means.

* * * * *

UNITED STATES PATENT AND TRADEMARK OFFICE
CERTIFICATE OF CORRECTION

PATENT NO.   : 6,661,964 B1
DATED        : December 9, 2003
INVENTOR(S)  : Satoshi Otsuka It is certified that error appears in the above-identified patent and that said Letters Patent is hereby corrected as shown below:

Column 3,
Line 40, change "enable" to -- enable --.

Column 10,
Line 41, delete "may".

Signed and Sealed this

Sixth Day of July, 2004

JON W. DUDAS
*Acting Director of the United States Patent and Trademark Office*